FERROELECTRIC STORAGE DEVICE USING GADOLINIUM MOLYBDATE

Original Filed March 25, 1969 4 Sheets-Sheet 1

INVENTOR
AKIO KUMADA

BY Craig, Antonelli, Stewart & Hill

ATTORNEYS

FERROELECTRIC STORAGE DEVICE USING GADOLINIUM MOLYBDATE

Original Filed March 25, 1969 4 Sheets-Sheet 2

INVENTOR
AKIO KUMADA

BY Craig, Antonelli, Stewart & Hill

ATTORNEYS

FERROELECTRIC STORAGE DEVICE USING GADOLINIUM MOLYBDATE

Original Filed March 25, 1969 4 Sheets-Sheet 3

INVENTOR
AKIO KUMADA

BY Craig, Antonelli, Stewart & Hill

ATTORNEYS

FERROELECTRIC STORAGE DEVICE USING GADOLINIUM MOLYBDATE

Original Filed March 25, 1969 4 Sheets-Sheet 4

INVENTOR

AKIO KUMADA

BY Craig, Antonelli, Stewart & Hill

ATTORNEYS

United States Patent Office

Re. 28,179
Reissued Oct. 1, 1974

28,179

FERROELECTRIC STORAGE DEVICE USING GADOLINIUM MOLYBDATE

Akio Kumada, Kodaira, Japan, assignor to Hitachi, Ltd., Tokyo, Japan

Original No. 3,623,031, dated Nov. 23, 1971, Ser. No. 810,202, Mar. 25, 1969. Application for reissue Jan. 25, 1972, Ser. No. 220,669
Claims priority, application Japan, Mar. 30, 1968, 43/20,817
Int. Cl. G11c *11/22*
U.S. Cl. 340—173.2 11 Claims

Matter enclosed in heavy brackets [ ] appears in the original patent but forms no part of this reissue specification; matter printed in italics indicates the additions made by reissue.

ABSTRACT OF THE DISCLOSURE

Electrodes for applying a voltage are provided on upper and lower surfaces of a stable irregular ferroelectric body such as $Gd_2(MO_4)_3$ single crystal which strains at the time of polarization reversal and is stable at room temperature or a similar stable irregular ferroelectric body which has a clear threshold voltage for polarization reversal, to compose a memory element and a load element is connected to one of the electrodes in series with said memory element. Read-out or write-in pulses having a voltage sufficient to cause the polarization reversal of said stable irregular ferroelectric body and with a polarity opposite to each other are applied to said memory element and load element from a driving circuit, and the change in the polarization of said memory element when the read-out pulse is applied is read out as a change in voltage across the load element.

BACKGROUND OF THE INVENTION

1. Field of the Invention

This invention relates to an electric storage device employing a ferroelectric capacitor.

2. Description of the Prior Art

A ferroelectric memory is well known in which a binary digital signal is memorized by the direction of spontaneous polarization of a ferroelectric.

Up to now, as ferroelectrics for a memory such materials as barium titanate, triglycine sulfate and the like have been considered. Now, a special feature of the ferroelectric memory is that a winding wound around a memory element is not needed as in the case of a ferrite core using magnetism, and it is sufficient to provide reticulate electrodes on the upper and lower surfaces of a ferroelectric crystal, so that the construction becomes very simple. Therefore, it is known that a memory element can be made small in size and is suited for constructing a large capacity memory. However, memory elements must be arranged in matrix form and the element must be driven by coincident-voltage in order to provide a large capacity memory; then the disturbance voltage generated at the time of write-in or readout becomes inevitably one half of the write-in or readout voltage. Generally, a ferroelectric memory has such a character that its memory state becomes unstable after the repeated application of said disturbance voltage since its nonlinearity of switching time characteristics is slow. Therefore, when the write-in is carried out to all elements of a memory matrix having many memory elements, a defect arises such that the whole memory content becomes unstable. Much effort has been made to lower the disturbance voltage and has been possible to costruct a matrix plane having memory elements of about $10^4$. However, when the write-in is carried out to all of the elements, the same memory content must be written again before the memory state becomes unstable and the record of the memory content disappears; such a memory is not suitable for practical use. The cause of the instability of the memory state is considered to be as follows, namely the value of the coercive field of the ferroelectric is strongly dependent upon the frequency and voltage in general and the polarization reversal is caused even by a small back voltage when it is applied for a long time, that is, the instability is considered to be caused by such a property of the ferroelectric that the coercive field is zero against the gradual change of the electric field. Therefore, there has been for many years a demand for a ferroelectric which has a threshold value in the coercive field and does not change however often a voltage may be applied, if the voltage is lower than the threshold value, and much effort has been made by many researchers to find such a ferroelectric. However, such a ferroelectric has not yet been proposed.

Now, the present inventors have found that the strain of a unit cell of gadolinium molybdate $Gd_2(MoO_4)_3$ or its crystallographic isomorphs differs depending upon the directions of the spontaneous polarization and have proposed that such a ferroelectric named an irregular ferroelectric by us can be used as an electromechanical transducer. (U.S. Pat. application Ser. No. 749,509 filed on Aug. 1, 1968).

It was found by continued study that, in addition to said gadolinium molybdate (hereinafter referred to as GMO in this specification) and its crystallographic isomorphs, that is, $R_xR'_{1-x})_2O_33Mo_{1-e}FeO_3$ (where R and R' are at least one rare earth element, respectively, and x and e take a value 0–1.0 and 0–0.2, respectively), such materials as boracite, that is, $Me_3B_7OX$ (where Me is a diatomic metal and X is a halogen), KDP (potassium dihydrogen phosphate), Rochelle salt and the like have also the irregular ferroelectric characteristic.

However, Rochelle salt has such defects namely its Curie point is so low as 23° C., it is water soluble, weak in mechanical strength and apt to be impaired by moisture or desiccation. The Curie point of KDP also is such a low temperature as −150° C. Therefore, the presently known irregular ferroelectrics which are stable at room temperature are GMO and its crystallographic isomorphs and boracite.

These stable irregular ferroelectrics have a clear threshold value of applied voltage at which is caused the polarization reversal and are best suited for the ferroelectric memory.

SUMMARY OF THE INVENTION

The main object of the present invention is to provide a ferroelectric memory which is stable in operation.

Another object of the present invention is to provide a small-sized but large capacity memory.

A further object of the present invention is to make it possible to incorporate an irregular ferroelectric into a memory.

Therefore, the present invention comprises essentially a storage device comprising a memory element composed of an irregular ferroelectric body which strains at the time of polarization reversal and is stable at room temperature and a pair of electrodes provided on the upper and lower surfaces of said irregular ferroelectric body for applying a voltage to said irregular ferroelectric body, a load connected in series with the memory element for detecting the change of polarization of said memory element and a driving means for applying a write-in or read-out voltage, each having an opposite polarity, between said pair of electrodes of said memory element.

DESCRIPTION OF THE PREFERRED EMBODIMENTS

Figure 1:
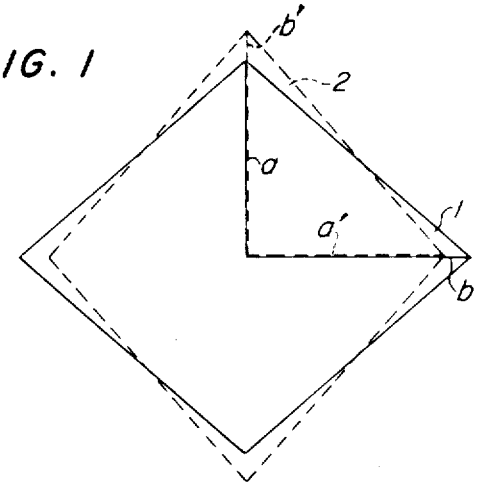
FIGS. 1 and 2 are diagrams for illustrating the strain of an irregular ferroelectric at the time of the polarization reversal, respectively.

FIG. 1 is a diagram illustrating that an irregular ferroelectric strains at the time of polarization reversal. In the figure, rectangles shown by a solid line or dotted line indicate a single crystal plate of an irregular ferroelectric, and showing a plane view of a surface of the crystal cut along the (001) plane, so-called C-plane and further cut along the (110)cleavage plane seen from the direction parallel with the c-axis. Here, the GMO crystal is explained as an example of an irregular ferroelectric. The unit cell of GMO single crystal is orthorhombic with point symmetry mm2, and its a, b and c-axis were measured by X-ray diffraction method using an X-ray goniometer and the result is as follows:

$$a=10.388\pm0.005 \text{ A.},$$
$$b=10.426\pm0.005 \text{ A.},$$
$$c=10.709\pm0.005 \text{ A.}$$

Upper and lower surfaces of z-cut surface of the GMO crystal are ground and electrodes are provided on the whole surfaces. Thus, an electric field can be applied to the GMO crystal in the direction of the c-axis.

Now, when negative and positive voltages are applied on the outside and inside of the surface of paper on which GMO crystal plate is drawn, respectively, the GMO crystal plate is reversed spontaneously in polarization in the direction from the inside to the outside of the paper and comes to the state 1 shown by the solid line in the figure. Next, contrary to the above, when the positive voltage is applied on the outside of the paper and the negative voltage is applied on the inside of the paper, the GMO crystal is reversed spontaneously in polarization in the direction from the outside to the inside of the paper and is deformed into the state 2 shown with the dotted line in the figure. This deformation interchanges the a-axis and b-axis and in the figure a changes into b′ and b changes into a′. When the strain caused by said deformation is defined by $X,=a-b/a+b$, and X is about $1.5\times10^{7E'3}$ in the case of the GMO crystal and the strain can be measured directly by the method described above.

Figure 2:
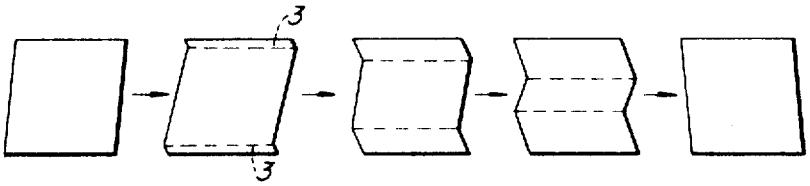

FIG. 2 is a diagram showing one mode of the deformation of an irregular ferroelectrics plate. The deformation is shown with exaggeration in FIGS. 1 and 2.

The crystal plate of FIG. 2 is also a 45° z-cut plate as the crystal plate shown in FIG. 1 (a plate in parallel with each surface indicated by Miller indices (001), (110) and (110). As can be seen from FIG. 1, the GMO crystal and the like do not change their length in the surface (110) and (110) at the time of the polarization reversal. Therefore, when the polarization reversal is caused by a voltage applied to the electrodes provided on the upper and lower surfaces of the z-cut surface, the shear strain is caused as shown in FIG. 2. The deformation caused by the shear strain has generally such a deformation mode as shown in the figure, where a nucleus is produced at the periphery of the crystal and the deformation gradually reaches the center of the crystal, thus the crystal deforms as a whole. When said nucleus of the deformation is too small, the deformation cannot be maintained due to the force from the neighboring crystal, thus said nucleus of the deformation must have a certain magnitude. For example, the width of the nucleus 3 produced in the crystal shown in FIG. 2 must be larger than a certain value. In order to cause such a deformation larger than a certain magnitude, an energy more than a certain value may be required, and it can be considered that this is the reason why an irregular ferroelectric which strains at the time of the polarization reversal has a threshold value in the voltage applied for causing the polarization inversion.

Figure 3A:
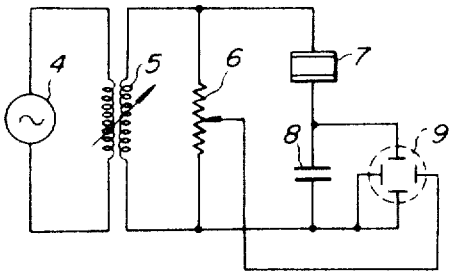
FIGS. 3a, 3b and 4 are diagrams illustrating that the irregular ferroelectric has characteristics different from an ordinary ferroelectrics, respectively.
Figure 3B:
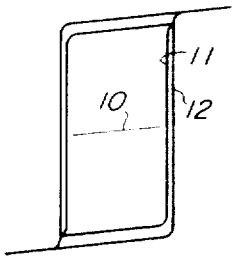
Figure 4:
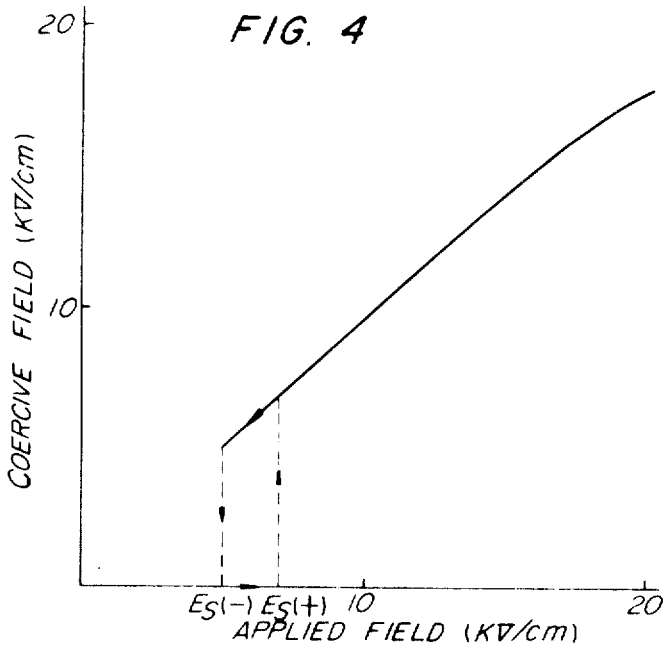

FIGS. 3a and 3b are diagrams of measuring circuit and output waveform for illustrating the characteristics of an irregular ferroelectric, and FIG. 4 is its characteristic diagram.

Referring to FIG. 3a, reference numeral 4 is an alternating voltage source, 5 a slidac, 6 a variable resistance, 7 a crystal to be measured, which is, for example, GMO single crystal, 8 an output condenser and 9 an oscilloscope for observing the ferroelectric hysteresis loop (hereinafter referred to as D-E loop). Said GMO single crystal 7 is a z-cut plate having a thickness of 0.2 mm. and a size of 1 mm. × 1 mm., and its upper and lower surfaces are ground, then transparent electrodes are provided on the whole surfaces. This single crystal 7 is placed under a polarized microscope (not shown) in order that change in domains is observed with crossed polarization.

When a 50 Hz. AC voltage is applied to the GMO single crystal 7 from the alternating voltage source 4, the D-E loop of the GMO single crystal 7 can be observed. Now, when the voltage applied to the single crystal 7 is increased by rotating the slidac, domains of the crystal 7 do not change if the peak-to-peak value of the applied voltage is lower than 280 $v._{p-p}$, and only a line 10 appears on the surface of the oscilloscope 9 as shown in FIG. 3b. Then, when the applied voltage is made about 280 $v._{p-p}$ peak-to-peak value, said domains change suddenly and a D-E loop indicated by 11 appears on the surface of the oscilloscope 9, and when the applied voltage is increased further, a hysteresis loop as indicated by 12 can be observed. When the voltage is decreased, this hysteresis loop is observed up to an applied voltage of 200 $v._{p-p}$, and when the voltage is made lower than the value, the hysteresis loop disappears suddenly. This phenomenon indicates that GMO single crystal 7 has a threshold value E, in the applied voltage necessary for causing the polarization reversal at room temperature. This threshold electric field $E_s$ can be determined by the relation between the coercive field and applied field of the D-E loop shown in FIG. 4 which is drawn based on the observed result shown in FIG. 3b. That is, it can be seen from the figure that the threshold electric field ($E_s(+)$ at rise time is about 7 kv./cm. and the threshold electric field $E_s(-)$ at fall time is about 5 kv./cm. Therefore, when the GMO crystal is used as ferroelectrics memory, a stable storage operation can be carried out by applying an electric field of more than 7 kv./cm. to the crystal at the time of readout and write-in and making the disturbance voltage lower than 5 kv./cm. Here, said threshold electric field is a value in the case that electrodes are provided on the upper and lower surfaces in their entirety of said single crystal. However, almost the same results were obtained with many other GMO samples when identical electrodes were provided, according to the experiments by the present inventor. Further, it was shown by said experiments that when electrodes are provided at a portion of the upper and lower surfaces of the single crystal, the threshold electric field differs depending upon the shape of the electrodes and the angle to the crystallographic axis. Furthermore, transparent electrodes were used in the above experiments for the purpose of observation, of course opaque electrodes can also be used.

Figure 5A:
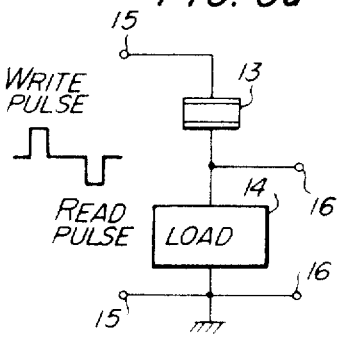
FIGS. 5a, 5b, 6a, 6b and 7 are diagrams illustrating the construction of circuits of different embodiments according to the present invention, respectively.
Figure 5B:
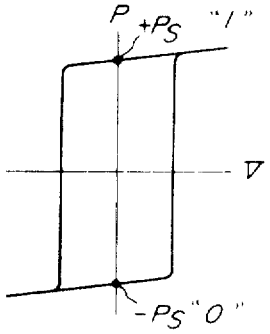

FIGS. 5a and 5b are diagrams illustrating the construction of an embodiment of the present invention, wherein FIG. 5a shows an example where said irregular ferroelectric crystal, for example, the GMO crystal is used as a memory element and the operation of write-in and readout is carried out by a voltage pulse, and FIG. 5b is a diagram showing a polarization P versus applied voltag V hysteresis loop of said GMO crystal. Referring to FIG. 5a, reference numeral 13 is a memory element composed by providing electrodes on the 45° z-cut surfaces of a GMO single crystal of 0.2 mm. in thickness, 14 a load connected in series with said memory element 13, 15 a terminal for applying the write-in and readout voltage and 16 an output signal terminal.

In order to write a digital signal "1" into the memory element 13 comprising the GMO single crystal, a positive voltage pulse is applied to the memory element 13 through the terminal 15. That is, when a positive voltage pulse of 150 v. is applied to the memory element 13 in the state of $-P$, shown in FIG. 5b (the state stored as "0") through the terminal 15, the polarization reversal is cause in the GMO crystal and the state of spontaneous polarization $+P_s$ shown in FIG. 5b is produced; thus "1" is stored. Now, when said positive voltage pulse is further applied to the state "1," the polarity of the spontaneous polarization $+P_s$ does not change and the stored content "1" does not change. In order to write a digital signal "0," a negative pulse of 150 v. is applied to said memory element.

The readout of stored contents can be carried out by applying a negative voltage pulse of 150 v. to the terminal 15 through the readout load 14 in the circuit shown in FIG. 5a. That is, when "1" is stored, the polarization reversal is caused in the GMO crystal by the applied negative voltage pulse and the change in impedance of the memory element 13 caused by the polarization reversal appears at the output terminals 16 as the change in voltage across the load 14, and when "0" is stored, the polarization reversal is not caused by said applied negative voltage pulse and the impedance change of the memory element does not result; then only a small output is observed. Thus, stored contents "1" and "0" can be distinguished.

In the above embodiment, the voltage applied to the memory element at the time of write-in and readout was 150 v., then the electric field was 7.5 kv./cm., the present invention is not limited to this value, the write-in and readout can be carried out by a suitable electric field, if the electric field were more than the threshold electric field $E_s$ (+) of said memory element (as described before, this value differs depending upon the provided electrodes), that is, in this case more than 7 kv./cm. The write-in and readout voltage can be made smaller by making the thickness of said GMO crystal less than 0.2 mm.

Figure 6A:
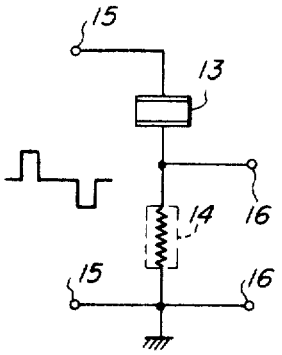
Figure 6B:
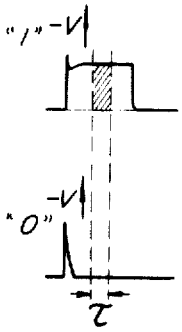

FIGS. 6a and 6b show another embodiment of the present invention, in which FIG. 6a is a circuit diagram wherein a resistor is used as the load in FIG. 5a, and FIG. 6b is a diagram showing a readout output waveform of the circut shown in FIG. 6a. Referring to FIG 6a, if the signal "1" is stored in the memory element 13 at the time when the negative voltage is applied to the terminal 15, an output signal indicated by "1" in FIG. 6b is produced at the output terminal 16 as the change in voltage across the resistor 14. Onothe other hand, when the signal "0" is stored in said memory element 13, an output signal indicated by "0" in FIG. 6b is produced at said output terminal 16. Therefore, if a pulse is produced at a time $\tau$ indicated by dotted lines in FIG. 6b to carry out a sampling, the stored content "1" or "0" can be clearly distinguished.

In FIG. 6a, there is shown a case where the resistor is used as the load, but the load is not limited to resistive load and such loads can be used as a capacitive load, a resistive-capacitive load or a load using a diode or transistor in parallel, and the output signal waveform differs depending upon each load.

Figure 7:
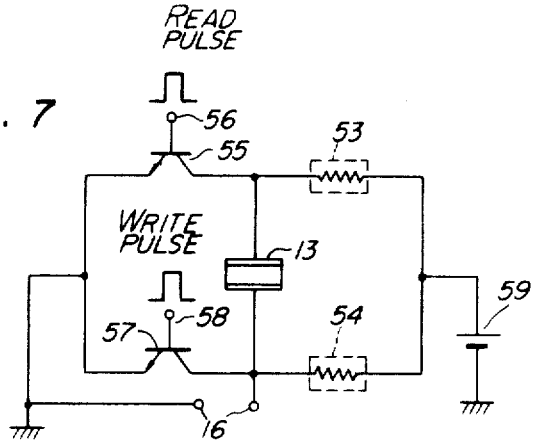

FIG. 7 is a diagram showing a circuit construction of a further embodiment of the present invention. In the figure, two electrodes of the memory element 13 are connected to a DC power source 59 through resistors 53 and 54, respectively, and further connected to collectors of transistors 55 and 57, respectively. Emitters of said two transistors are connected together and grounded. Then, when a positive pulse is applied to the base 58 of the transistor 57, the transistor 57 is made to conduct and the lower electrode of the memory element 13 is grounded; thus, a voltage is applied to the memory element 13 via the DC power source 59 and the resistor 53 and the digital signal "1" is written. On the other hand, when a positive voltage is applied to the base 56 of the transistor 55, the transistor 55 is made to conduct and the upper electrode of the memory element 13 is grounded earthed; thus, in this case, a voltage opposite to the one before is applied to said memory element via the DC power source 59 and the resistor 54 and the stored content of the memory element 13 is read out.

The construction shown in FIG. 7 is advantageous in that a transistor having a relatively low breakdown voltage can be used as said transistors 55 and 57 since a voltage much higher than the threshold value of the memory element 13 is not applied to the transistors 55 and 57.

Figure 8:
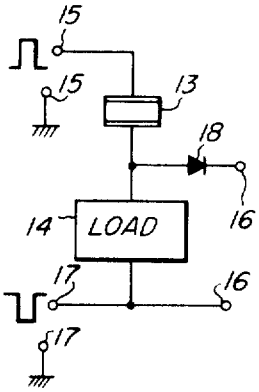
FIGS. 8, 9, 10a, 10b and 11 are diagrams illustrating the constructions formed in matrix form of different embodiments of the present invention, respectively.

FIG. 8 is a diagram showing a circuit construction of still another embodiment of the present invention, in which the driving method differs from the embodiments of FIGS. 5 and 6. In the embodiment shown in FIG. 8, a terminal 17 is provided in addition to the write-in and readout terminal 15. Pulse signals having a polarity opposite to each other are applied to the terminal 15 and terminal 17, respectively. The pulse height of these two pulses is so determined that each pulse alone is insufficient to reverse the polarization of the memory element 13 (that is, in the case of said GMO crystal, it is lower than 5 kv./cm.) and when two pulses are applied at the same time, the superimposed pulse is sufficient to reverse the polarity of the memory element 13 (that is, in the case of the GMO crystal, it is higher than 7 kv./cm.). Usually, two voltage signals having the same height and opposite polarity are chosen as said two pulse signals, for simplicity.

For example, when the memory element 13 is made of a 45° z-cut GMO single crystal of 100$\mu$ in thickness, a pulse of +45 v. is applied to the terminal 15 and another pulse of −45 v. is applied to the terminal 17 (the electric field applied to the memory element 13 is 4.5 kv./cm. when each pulse alone is applied, and it becomes 9 kv./cm. when the two pulses are applied at the same time) at the time of the write-in of the digital signal "1," and a pulse of −45 v. is applied to the terminal 15 and another pulse of +45 v. is applied to the terminal 17 at the time of the readout, thus the operation of the write-in and readout can be carried out.

Therefore, the output signal produced at the output terminal 16 differs depending upon the stored content of the memory element 13 at the time of the readout, as described before.

By the way, a diode 18 provided between the connection point of the memory element 13 and load 14 and the output terminal 16 is a means to prevent the negative voltage applied to the terminal 17 at the time of the write-in appearing directly at the output terminal 16, and the omission of it does not affect the operation of the memory.

As described above, the memory element 13 can be drive selectivity in the embodiment of FIG. 8, since the readout or write-in operation is carried out only when two driving pulses of opposite polarity are applied simultaneously to the terminals 15 and 17, respectively.

Figure 9:
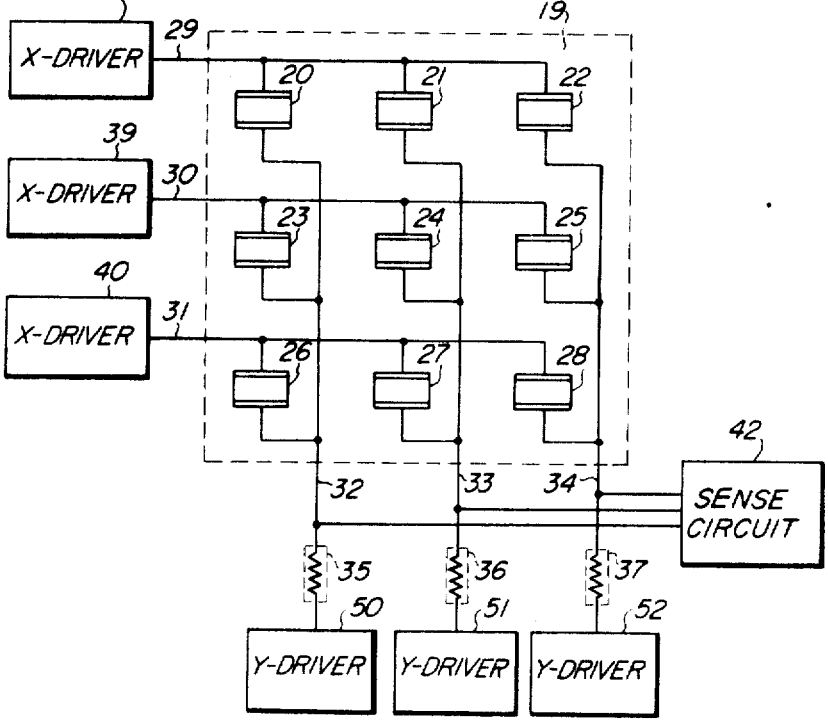

FIG. 9 is a diagram illustrating another embodiment of the present invention, in which a plurality of unit memory circuits shown in FIG. 8 are disposed in matrix form. In the figure, the portion 19 encircled by a dotted line is a matrix of memory elements and its size 3 x 3. The matrix can be made in a desired suitable size, and in general, a matrix of i x j can be constructed. Reference numerals 20–28 indicate memory elements constructing the matrix 19, each of which is composed by providing electrodes on both surfaces of the z-cut surfaces of said irregular ferroelectrics, for example, a GMO single crystal.

All of the memory elements 20–28 are connected in such a manner that upper electrodes of the elements in each row of the matrix are connected together and connected further to X-drive lines 29–31, respectively, and lower electrodes of the elements in each column of the matrix are connected together and connected further to Y-drive lines 32–34, respectively. That is, upper electrodes of the memory elements 20–22, 23–25, and 26–28 are connected commonly to the X-drive lines 29, 30 and 31, respectively, and lower electrodes of the memory elements (20, 23, 26), (21, 24, 27), and (22, 25, 28) are connected commonly to the Y-drive lines 32, 33 and 34, respectively.

Said Y-drive lines 32–34 are connected to one end of resistors 35–37 provided as loads, respectively, and another end of said resistors 35–37 is connected to Y-drive circuits 50–52, respectively and a driving pulse being applied selectively to each Y-drive line. The X-drive lines 29–31 are connected to X-drive circuits 38–40, respectively, and the driving pulse is selectively applied to each X-drive line. The Y-drive lines 32–34 are connected to resistors 35–37, respectively, and further connected to a sense circuit 42. Said Y-drive circuits 50–52 are provided to each Y-drive line and apply the driving pulse selectively to each Y-drive line. However, in the case of parallel readout, one driving pulse can be applied to each Y-drive line from one driving circuit.

Two driving pulses of opposite polarity are selectively applied to the X-drive line and Y-drive line, respectively, by means of the construction described above, and a memory element provided at the crossed position is driven. For example, when the positive pulse is applied to the X-drive line 29 and the negative pulse is applied to the Y-drive line 33 at the same time, the digital signal "1" is written into the memory element 21. Further, when the negative pulse is applied to the X-drive line 30 and the positive pulse is applied to the Y-drive line 32 at the same time, the voltage produced across the resistor 35 differs depending upon the stored content "1" or "0" of the memory element 23, and the difference is detected by the sense circuit 42. The write-in and readout to other memory elements can be carried out by suitably selecting the X-drive line and Y-drive line.

As can be seen from the above description, a stored content of the memory element according to the present invention is destroyed when it is read out. Therefore, it is required to carry out a rewrite-in in order to keep the stored content of the memory element after the readout. For example, when a stored content of the memory element 28 is read out by applying the negative pulse to the X-drive line 31 and the positive pulse to the Y-drive line 34 simultaneously and it is detected by the sense circuit 42, the stored content of the memory element 28 is destroyed. Accordingly, if the rewrite-in is carried out by applying the write-in driving pulse to the X-drive line 31 and Y-drive line 34, depending upon the stored content of the memory element 28 detected by the sense circuit 42, the stored content can be retained. At this time, the operation to rewrite the digital signal "1" into said memory element 28 is the same as the write-in of "1" described before. The operation of rewrite-in of the digital signal "0" to said memory element 28 is carried out by applying the negative pulse to the Y-drive line 34 and also to the X-drive line 31, or not applying the pulse at all. This is because said memory element 28 is already in the state of "0" at the time of the readout, then it is only necessary to keep said memory element 28 in the same state without causing the polarization reversal.

Thus, when the rewrite-in operation is carried out as described above, the negative driving pulse is applied to the Y-drive line in each case of the rewrite-in of the digital signals "1" and "0," and one of the positive driving pulse and negative driving pulse (or no driving pulse) can be selected on the side of the X-drive circuit depending upon the stored content "1" or "0," and, therefore, the operation of the driving circuits 38–40 and 50–52 can be simplified.

In the case of the write-in operation, the same driving method as said rewrite-in can be used if such method is utilized that the readout is always carried out before the write-in.

As to the driving circuits 38–40, 50–52 and the sense circuit 42 shown in FIG. 9, a known circuit as the driving circuit and sense circuit of a ferroelectric memory or magnetic core matrix can be used and their details are omitted here.

Figure 10A:
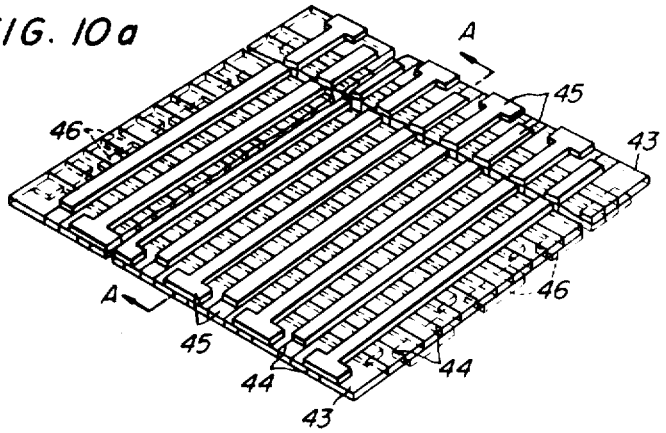
Figure 10B:
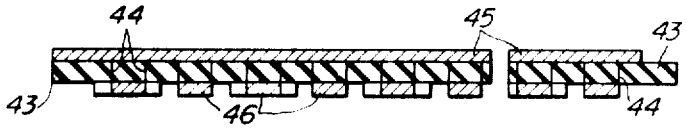

FIGS. 10a and 10b are diagrams illustrating an example of the construction of a memory matrix used in the storage device of the present invention, wherein FIG. 10a is a perspective view, and FIG. 10b is a sectional view along the line A—A in FIG. 10a. Said memory matrix corresponds to the memory matrix portion 19 in FIG. 9, and other portions can be constructed by utilizing the same circuit.

In the figures, reference numeral 43 indicates a 45° z-cut plate of an irregular ferroelectric crystal, for example, a GMO single crystal. In the GMO single crystal, the plane indicated by Miller's indices (001) and (110) is the cleavage plane, so that the crystal is apt to cleave along said plane. Therefore, when a z-cut plate of GMO single crystal ground to a thickness of 100$\mu$ is cut by an ultrasonic cutter or diamond cutter into a width of 100$\mu$ parallel to said (110) plane and a plane perpendicular to said plane, a crystal plate 43 having meshshaped crack 44 is obtained as shown in the figures. On the surface of the crystal plate 43, electrodes 45 having a width of about 100$\mu$ are provided with a space of about 100$\mu$. Thus, said electrode 45 is provided to cover a line of mesh entirely on every other mesh of said crystal plate 43. Electrodes 46 are provided on the back surface of said crystal plate 43 in the direction perpendicular to said electrode 45 in a shape which is the same as with the face surface. A small mesh of crystal positioned at an intersecting point of said electrodes 45 and 46 forms a memory element by such construction.

Said electrodes 45 and 46 can be provided by evaporating a metal such as aluminum through a mask placed on the crystal plate 43. A transparent electrode including indium dioxide $InO_2$ as a principal ingredient can be formed by evaporating indium metal in vacuum on the crystal plate 43 and performing heating oxidation in the atmosphere or anodic oxidation by electrolysis. A transparent electrode can also be formed by spraying a liquid of tin tetrachloride $SnCl_4$ instead of said metal on the crystal plate 43 maintained at a temperature of about 500° C. for creating by reaction a transparent electrode including tin dioxidle $SnO_2$ as principal ingredient, and cooling it gradually.

A 100 x 100 memory matrix can be formed on a 2 cm. x 2 cm. GMO crystal plate by the method described above.

In FIGS. 10a and 10b there were shown an example in which is used a GMO single crystal as an irregular ferroelectric. As described above, the GMO single crystal is accompanied by a strain of about $X_s=1.5\times'^{7e'3}$ at the time of the polarization reversal, so that a partial deformation cannot be caused in a crystal plate. Therefore, it was necessary to cut the crystal in mesh shape as shown in FIGS. 10a and 10b. However, said strain $X_s$ of an irregular ferroelectric such as boracite is one order smaller than that of GMO single crystal, so that partial deformation can be caused in a crystal. When such a crystal is used, the mesh-shaped cut as shown in FIGS. 10a and 10b is not necessary, and the construction of a memory matrix can be considerably simplified.

Figure 11:
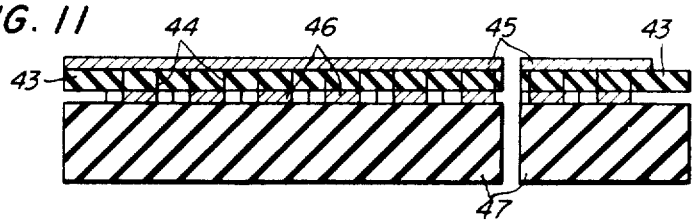

FIG. 11 is a diagram illustrating another example of the construction of the memory matrix according to the present invention, which differs from the embodiment of FIGS. 10a and 10b in that a memory matrix is provided on an insulator substrate 47. The structure of the memory matrix shown in FIGS. 10a and 10b is very weak since the thin GMO crystal is cut in mesh shape. Therefore, it is effective to bind it on the insulator substrate having a sufficient thickness. Also, in the case of manufacturing said memory matrix, such a method is effective as first the electrode 46 is formed on the back surface of the GMO crystal plate, next the plate is bound on said insulator substrate 47, then said said GMO crystal plate is cut in mesh-shape from the face surface thereof and the face electrode 45 is provided. Though the present invention has been described above in conjunction with an embodiment using the GMO single crystal as an example, the present invention is not limited to the GMO single crystal, and boracite and other stable irregular ferroelectrics can be used by the same construction.

What is claimed is:

1. A storage device comprising: a memory element including a stable irregular ferroelectric body composed of a crystal plate selected from a group of $Gd_2(MoO_4)_3$ single crystal and its crystallographic isomorphs and boracite which strains at the time of polarization reversal and is provided with a pair of electrodes on upper and lower surfaces thereof;

a load connected in series with said memory element for detecting the change in polarization of said memory element;

driving means for applying a write-in voltage pulse and a readout voltage pulse to the series connected circuit of said irregular ferroelectric body and said load, wherein said respective write-in voltage pulse and said readout voltage pulse each has a pulse height sufficient to cause the polarization reversal of said irregular ferroelectric body.

2. A storage device according to claim 1, wherein said irregular ferroelectric body consists of $Gd_2(MoO_4)_3$.

3. A storage device according to claim 1, wherein said irregular ferroelectric body consists of crystallographic isomorph of $Gd_{22}(MoO_4)_3$.

4. A storage device according to claim 1, wherein said irregular ferroelectric body consists of boracite.

5. A storage device comprising: a plurality of memory elements arranged in rows and columns into a matrix shape wherein each memory element comprises a stable irregular ferroelectric body made of a GMO single crystal plate which strains at the time of polarization reversal and is provided with a plurality of electrodes on face and back surfaces thereof cut crosswise in mesh shape in two directions intersecting each other, said plurality of electrodes covering a mesh of said GMO single crystal plate at the place of each crossing point thereof, and wherein one of said pair of electrodes of said memory elements in each row of said matrix is connected commonly to form X-drive lines, respectively, and the other one of the pair of electrodes of said memory elements in each column of the matrix is connected commonly to form Y-drive lines, respectively; loads connected in series to Y-drive lines, respectively, for detecting the change in polarization of said memory element; and driving means for selectively applying two driving pulses of opposite polarity to one of the X-drive lines and to one of the Y-drive lines through said loads, respectively, the pulse height of each of said two driving pulses being insufficient to reverse the polarization of said irregular ferroelectric body, while a superimposed pulse height of said two driving pulses is sufficient to reverse the polarization of said irregular ferroelectric body.

*6. A reversibly polarized storage device comprising:*

*a crystal of a material selected from the group consisting $Gd_2(MoO_4)_3$ and its crystallographic isomorphs and boracite;*

*electrodes connected to said crystal; and*

*means for applying a write-in voltage pulse and a read-out voltage pulse to said electrodes for selecting one of the reversible polarization states of the crystal.*

*7. A bistable storage element comprising:*

*a reversibly polarizable crystal of a material selected from the group consisting of $Gd_2(MoO_4)_3$ and its crystallographic isomorphs and boracite having a ferroelectric axis;*

*electrodes connected to said crystal;*

*means for applying a write-in voltage pulse and a read-out voltage pulse to said electrodes, the polarity of said pulses corresponding to the direction of polarization; and*

*means for detecting the bistable stable of said crystal by sensing the sign of said polarization.*

*8. A ferroelectric switching element comprising:*

*a reversibly polarizable crystal of boracite having a ferroelectric axis, said crystal having two opposing parallel faces that are right angles to said ferroelectric axis;*

*electrodes disposed on said parallel faces; and*

*means for applying voltage pulses to said electrodes, the polarity of said applied voltage pulses determining the direction of polarzaton after ther termnation.*

*9. A reversibly polarizable storage device comprising:*

*a crystal of a material selected from the group consisting of gadolinium molybdate, the crystallographic isomorphs thereof, and boracite; and*

*means for selectively writing information in and reading information out said crystal comprising:*

*first and second electrodes disposed on opposite planar surfaces of said crystal, and*

*means for selectively applying a write-in voltage pulse and a read-out voltage pulse, the magnitude of which is at least equal to the voltage which causes a reversal of the polarization state of said crystal, to said electrodes, so as to selectively place said crystal in one of the reversible polarization states thereof and to subsequently read out the state of polarization of said crystal exclusively by the application of a selected voltage pulse to said electrodes.*

*10. A reversibly polarizable storage device according to Claim 9, wherein said crystal is made of boracite.*

*11. A reversibly polarizable storage device according to Claim 9, further including means, connected in series with one of said electrodes of said crystal, for detecting*

*a change in the voltage thereacross in response to said read-out pulse, so as to detect the bistable state of spontaneous polarization into which said crystal was selectively placed.*

References Cited

The following references, cited by the Examiner, are of record in the patented file of this patent or the original patent.

UNITED STATES PATENTS

| | | | |
|---|---|---|---|
| 2,901,679 | 8/1959 | Matthias | 340—173.2 X |
| 3,005,976 | 10/1961 | Anderson | 340—173.2 |
| 3,155,833 | 11/1964 | Fries | 340—173.2 X |
| 3,365,400 | 1/1968 | Pulvari | 340—173.2 X |
| 3,476,951 | 11/1969 | Pulvari | 340—173.2 X |

| | | | |
|---|---|---|---|
| 3,079,591 | 2/1963 | Anderson | 340—173.2 |
| 3,437,432 | 4/1969 | Borchardt | 23—51 |
| 3,559,185 | 1/1971 | Burns et al. | 340—173.2 X |
| 3,510,852 | 5/1970 | Bartlett et al. | 340—173.2 |

OTHER REFERENCES

Borchardt et al. Ferroelectric Rare-Earth Molybdates, April 1967, Journal of Applied Physics, Vol. 38, No. 5, pp. 2057–2060.

Borchardt et al, $Gd_2(MoO_4)_3$: A Ferroelectric Laser Host, Jan. 15, 1966, Applied Physics Letters, Vol. 8, No. 2, pp. 50/52.

STUART N. HECKER, Primary Examiner